E. J. Meyers.
Corn-Planter.
No. 121,649.
Patented Dec. 5, 1871.
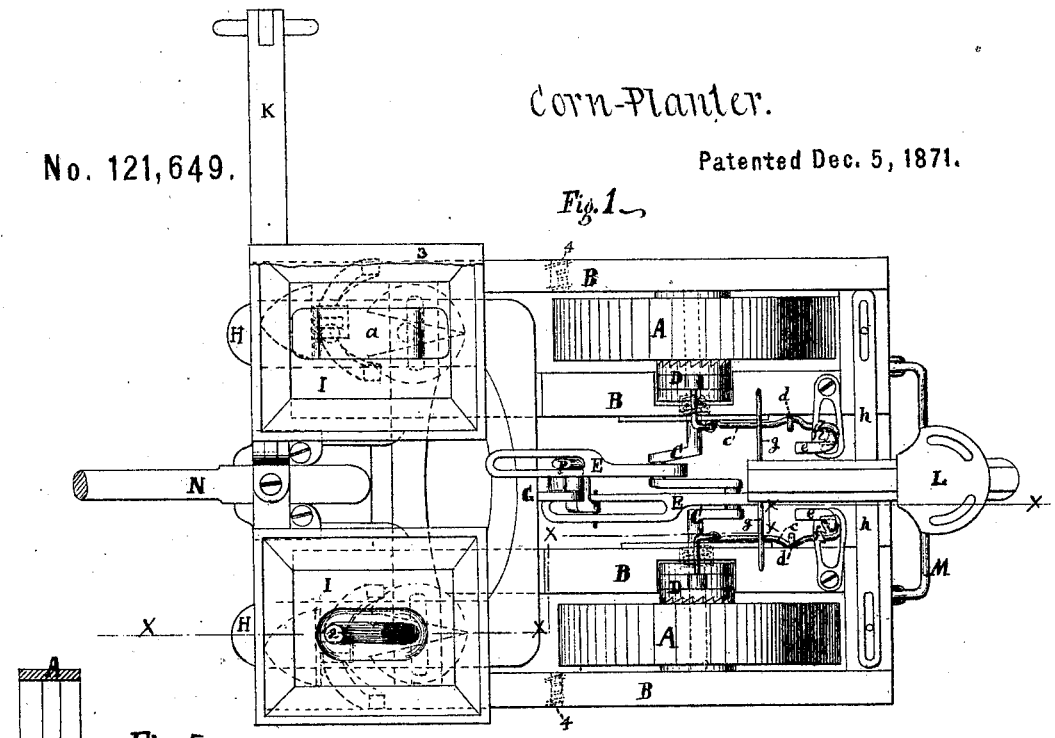
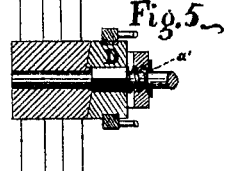
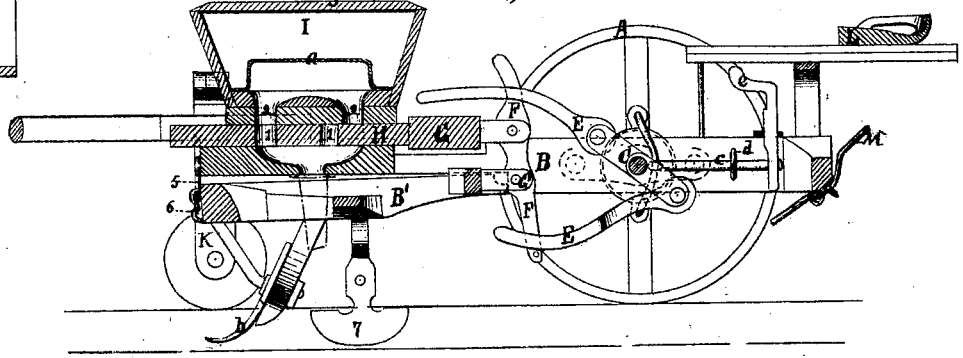
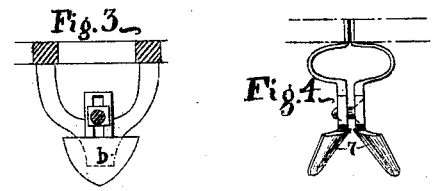 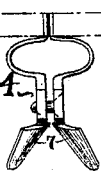
Witnesses:
J. G. C. Clayton,
G. Mattys.
Inventor:
Edwin Jas. Meyers
by his attys
Jo. C. Clayton & Co.

121,649

UNITED STATES PATENT OFFICE.

EDWIN JAMES MYERS, OF ONAWA, IOWA.

IMPROVEMENT IN CORN-PLANTERS.

Specification forming part of Letters Patent No. 121,649, dated December 5, 1871.

*To all whom it may concern:*

Be it known that I, EDWIN JAMES MYERS, of Onawa, in the county of Monona and in the State of Iowa, have invented certain new and useful Improvements in Corn-Planters; and do hereby declare that the following is a full, clear, and exact description thereof, reference being had to the accompanying drawing and to the letters of reference marked thereon, in which—

Figure 1 is a plan view. Fig. 2 is a vertical section through the line $x$ $x$ in Fig. 1; Fig. 3, a front view of the shovel; Fig. 4, a front view of the scraper; and Fig. 5 is a longitudinal section through the hub of the wheel and clutch and spring.

The nature of my invention consists in the use of a double crank-shaft or axle and levers for operating the slide for dropping the seed.

To enable others skilled in the art I will proceed to describe the construction and operation of my invention.

In the construction of my invention, in Fig. 1, A A are the wheels on which the machine is placed; B B, the frame; B', adjustable frame; C, the double crank-shaft or axle, to which are attached the clutches D D, which catch into the clutches on the inner face of the hubs of the wheels A. A spring, $a'$, keeps these clutches in place. E E are slotted levers hung on the axle, one in each crank, with their front and slotted ends attached to the vertical lever F, which is attached to the bar G for operating the slides H H, and which has its fulcrum in cross bar G', seen in Fig. 2. The slides H H have each two holes, 1, at the ends, which slide under the hoppers I I, and are to receive the seed and deposit it on the backward and forward strokes of the said slides. The hoppers have each two holes in the bottom thereof to allow the seed to pass through—one grain of corn at a time from each hopper. The hopper is constructed by forming the bottom of one piece of wood of sufficient thickness, through which a mortise is made to allow the slide H to pass; and the upper part of the hopper is fastened to the bottom in any way the most convenient to form a hopper. The holes 2 in the bottom of the hopper have covers $a$ $a$ raised above the bottom of the hopper, leaving a space at the sides about the size of the corn, so that the amount fed to the holes is regulated and fed to the holes, the whole pressure resting mainly on the covers $a$ $a$ and the side of the bottom. Apart from the holes covers may be put onto the hoppers, as seen at 3, Fig. 2; K, the guide for spacing the rows. This guide is attached to the front of the frame, and is hung to it by a universal joint, so that it can be turned out to make the row, or turned back onto the frame when not needed to space the row. It is composed of an arm of required length, bent at right angles, in the lower end of which is a wheel, which, in running over the ground, marks out the row. B' is a supplemental frame, seen in Fig. 2, which is adjustable, and is fastened to the frame B by means of spring-hinges at its rear ends, shown in dotted lines at 4, Fig. 1, and in front by means of a hook, 5, and slotted plate 6, for raising and lowering the same. To this frame is adjusted the shovel $b$ for opening the earth to receive the seed when deposited. I intend the use of two shovels; and behind the hoppers is on each side a scraper, 7, for covering the seed when deposited in the openings made by the shovels $b$. By adjusting this frame I am enabled to regulate the depth at which I wish to deposit the seed. $c$ $c$ are levers, which are attached to the clutches D D, having their fulcrums on the inside of the frame at $d$ $d$. These levers are operated on by the vertical levers $e$ $e$, which come up near to the seat, and are under the control of the driver, and are held in the required position by the ratchets $f$ $f$. The fulcrums of levers $e$ $e$ are at the under sides of the frame B. The seat L is attached to the frame by means of braces $g$ $g$ and $h$; M, the lever for clearing the wheels from the earth; N, the tongue.

In the operation of my invention the seed is placed within the hoppers, and the marker is placed in position, as shown in Fig. 2. The clutches D are let into the clutches on the faces of the hubs, and as the machine moves forward the axle revolves, giving motion to the levers E E, which alternately operate the ends of the vertical lever F, thus giving a reciprocating movement to the slides H H, which, at each movement, receive the number of grains to be dropped through the holes in the hopper and through the holes in the slides alternately, cutting off the discharge at each hole in the hoppers as the slide passes under them. The levers $c$ $c$ may be spring-levers, so as always to hold the clutches together, instead of springs in the clutches, until released by the driver operating on the vertical levers $e$ $e$, which are pressed outward and catch in the ratchets $f$ $f$, thus detaching the clutches and allowing the wheels to turn without distributing seed, so that the machine can be carried to any place without dropping seed. The scraper can be operated by the driver so as to clear the wheels from earth and keep them clean; or a spring may be attached to always keep it pressed on the periphery of the wheels.

By this invention I make an efficient seed-planter, cheap and light, and always ready to do the work required of a seed-planter.

Having thus described my invention in its construction and operation, what I desire to secure by Letters Patent is—

The axle C, bent so as to form cranks parallel to each other or on opposite sides of the axle, in combination with the slotted levers E E and F F, for the purpose of operating the slides H H, substantially as and for the purposes set forth.

In testimony that I claim the above-described certain new and useful improvements in corn-planters I have hereunto signed my name this 6th day of April, 1870.

EDWIN JAMES MYERS.

Witnesses:
ANDREW JACKSON RICHARDSON,
DAVID RICHARDSON. (133)